US011188860B2

(12) United States Patent
Chandra et al.

(10) Patent No.: US 11,188,860 B2
(45) Date of Patent: Nov. 30, 2021

(54) INJURY RISK FACTOR IDENTIFICATION, PREDICTION, AND MITIGATION

(71) Applicant: INTERNATIONAL BUSINESS MACHINES CORPORATION, Armonk, NY (US)

(72) Inventors: Nilanjana Chandra, Kolkata (IN); Munish Goyal, Armonk, NY (US); Anthony Gridley, Boronia (AU); Brett A. Squires, Roseville (AU); LanXiang Ye, Neutral Bay (AU)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 16/534,585

(22) Filed: Aug. 7, 2019

(65) Prior Publication Data

US 2019/0362281 A1 Nov. 28, 2019

Related U.S. Application Data

(63) Continuation of application No. 14/811,950, filed on Jul. 29, 2015, now Pat. No. 10,453,015.

(51) Int. Cl.
*G06N 20/00* (2019.01)
*G06Q 10/06* (2012.01)

(52) U.S. Cl.
CPC ......... *G06Q 10/0635* (2013.01); *G06N 20/00* (2019.01)

(58) Field of Classification Search
CPC . G06N 5/04; G06N 5/02; G06N 20/00; G09B 7/04; G06F 9/4446

(Continued)

(56) References Cited

U.S. PATENT DOCUMENTS 6,931,387 B1 * 8/2005 Wong ............... G06Q 10/04
706/50
7,363,193 B2 * 4/2008 Jacobs ............. G06Q 10/06
702/182

(Continued)

FOREIGN PATENT DOCUMENTS

CA 2511837 A1 7/2004
CA 2679546 A1 9/2008

(Continued)

OTHER PUBLICATIONS

Ahola, Terhi et al.; A spatio-temporal population model to support risk assessment and damage analysis for decision-making; International Journal of Geographical Information Science; 21:8; 935-953; Jul. 17, 2007.

(Continued)

*Primary Examiner* — Viker A Lamardo
(74) *Attorney, Agent, or Firm* — Schmeiser, Olsen & Watts; Nicholas L. Cadmus

(57) ABSTRACT

A method and system for identifying workplace risk factors is provided. The method includes monitoring via execution of multiple geographically distributed sensor devices, workplace injury based events associated with individuals at a multisite distributed workplace environment. Current injury data describing the workplace injury based events is stored and predicted future workplace injury based events associated with future workplace injury based events with respect to a predicted plurality of individuals at the multisite distributed workplace environment are determined. Injury risk mitigating actions associated with prevention of said predicted future workplace injury based events are generated and an associated cost optimized reduction plan for prioritized implementation of the injury risk mitigating actions is generated.

20 Claims, 9 Drawing Sheets

(58) Field of Classification Search
USPC .......................................................... 706/11
See application file for complete search history.

(56) References Cited

U.S. PATENT DOCUMENTS

| | | | | |
|---|---|---|---|---|
| 8,041,587 | B2* | 10/2011 | Watson | G06Q 10/063 |
| | | | | 705/7.11 |
| 8,712,827 | B2* | 4/2014 | Mollicone | G06Q 10/0639 |
| | | | | 705/7.38 |
| 10,453,015 | B2* | 10/2019 | Chandra | G06N 20/00 |
| 2002/0123906 | A1* | 9/2002 | Goetzke | G16H 40/67 |
| | | | | 705/2 |
| 2004/0128175 | A1* | 7/2004 | Andrzejewski | G06Q 10/06393 |
| | | | | 705/7.36 |
| 2004/0249701 | A1* | 12/2004 | Schwarz | G06Q 10/10 |
| | | | | 705/7.11 |
| 2005/0256744 | A1* | 11/2005 | Rohde | G06Q 10/00 |
| | | | | 705/2 |
| 2006/0287879 | A1* | 12/2006 | Malone | G09B 19/00 |
| | | | | 705/2 |
| 2008/0097944 | A1* | 4/2008 | Kelly | G16H 50/20 |
| | | | | 706/21 |
| 2008/0162352 | A1* | 7/2008 | Gizewski | G16H 40/60 |
| | | | | 705/50 |
| 2009/0012831 | A1* | 1/2009 | Grant | G06Q 10/06398 |
| | | | | 705/7.42 |
| 2009/0089108 | A1* | 4/2009 | Angell | G06Q 10/00 |
| | | | | 705/7.28 |
| 2009/0287525 | A1* | 11/2009 | Crossman | G06Q 10/063 |
| | | | | 705/7.11 |
| 2010/0030532 | A1* | 2/2010 | Arora | G06T 13/40 |
| | | | | 703/2 |
| 2010/0241464 | A1* | 9/2010 | Amigo | A61B 5/1123 |
| | | | | 705/4 |
| 2011/0022421 | A1* | 1/2011 | Brown | G06Q 10/00 |
| | | | | 705/4 |
| 2011/0112853 | A1* | 5/2011 | Tong | G06Q 10/10 |
| | | | | 705/2 |
| 2011/0184663 | A1* | 7/2011 | Mack | G01L 1/26 |
| | | | | 702/41 |
| 2012/0010488 | A1* | 1/2012 | Henry | A61B 5/0024 |
| | | | | 600/365 |
| 2012/0065987 | A1* | 3/2012 | Farooq | G16H 40/20 |
| | | | | 705/2 |
| 2013/0009993 | A1* | 1/2013 | Horseman | G16H 40/63 |
| | | | | 345/633 |
| 2014/0006045 | A1* | 1/2014 | Wund, II | G16H 15/00 |
| | | | | 705/2 |
| 2014/0324517 | A1* | 10/2014 | Harris | G06Q 10/0633 |
| | | | | 705/7.27 |
| 2017/0032255 | A1 | 2/2017 | Chandra | |

FOREIGN PATENT DOCUMENTS

| | | |
|---|---|---|
| EP | 2238476 A4 | 8/2015 |
| WO | 2002021389 A1 | 3/2002 |
| WO | 2004061738 A8 | 9/2004 |
| WO | 2005041145 A1 | 5/2005 |
| WO | 2009146510 A1 | 12/2009 |
| WO | 2013039911 A1 | 3/2013 |
| WO | 2013142900 A1 | 10/2013 |

OTHER PUBLICATIONS

Dawson et al.—Sample phenotype clusters in high-density oligonucleotide—2005—https://bmcbioinformatics.biomedcentral.com/tracklpdf/1 0.1186/1471-21 05-6-195 (Year: 2005).

Doherty, Paul J. et al.; Space-time analyses for forecasting future incident occurrence; a case study for Yosemite National Park using the presence and background learning algorithm; International Journal of Geographical Information Science; 28:5, 910-927; Mar. 25, 2014.

Friedman, Mark J.; List of IBM Patents or Patent Applications Treated as Related; Jul. 31, 2019; 1 page.

Yer et al.—A research model forecasting incident rates from optimized safety—2005—https://pdfs.semanticscholar.org/Of13/2aa506d9543e1adOd886683eec0992c78c19.pdf(Year:2005).

Mattis, Gene et al.; Predicting and Preventing Severe Workplace Injuries for Risk Management Professionals; A PMA Companies Thought Leadership Publication; Apr. 2012; 8 pages.

Pereira et al.—"Text analysis in incident duration prediction"—2014—https://its.mit.edu/sites/defaultifiles/documents/Pereira,%20F.,%20Rodrigues,%20F.%20and%20Ben-Akiva,%20M.%20(20 13),%20%E2%80%9CText%20analysis%20in%20incident%20duration %20prediction%E2%80%9D.pdf (Year: 2014).

Skwark et al.—Improved Contact Predictions Using the Recognition of Protein Like Contact Patterns—2014—http://journals.plos.org lploscompbiol/article/file?id=1 0.1371/journal.pcbi.1 003889 &type=printable (Year: 2014).

* cited by examiner

INJURY RISK FACTOR IDENTIFICATION, PREDICTION, AND MITIGATION

CROSS REFERENCE TO RELATED APPLICATIONS

This application is a continuation application claiming priority to Ser. No. 14/811,950 filed Jul. 29, 2015, now U.S. Pat. No. 10,453,015, issued Oct. 22, 2019 the contents of which are hereby incorporated by reference.

FIELD

The present invention relates generally to a method for identifying critical risk factors and in particular to a method and associated system for identifying and managing critical risk factors impacting workplace health and safety.

BACKGROUND

Determining workplace safety issues typically includes an inaccurate process with little flexibility. Resolving safety issues may include a complicated process that may be time consuming and require a large amount of resources. A typical safety monitoring process may not take into account all related factors and therefore is unable to execute appropriate corrective actions. Accordingly, there exists a need in the art to overcome at least some of the deficiencies and limitations described herein above.

SUMMARY

A first aspect of the invention provides a workplace risk factor identification method comprising: monitoring, by a computer processor of a centralized server via execution of multiple geographically distributed sensor devices, a plurality of workplace injury based events associated with a plurality of individuals at a multisite distributed workplace environment; storing, by the computer processor within the centralized server, current injury data describing the plurality of workplace injury based events; generating, by the computer processor based on the current injury data and previously retrieved injury data describing previously retrieved historical workplace injury based events, predicted future workplace injury based events associated with future workplace injury based events with respect to a predicted plurality of individuals at the multisite distributed workplace environment; generating, by the computer processor based on the predicted future workplace injury based events, injury risk mitigating actions associated with prevention of the predicted future workplace injury based events; and generating, by the computer processor based the injury risk mitigating actions, a cost optimized reduction plan for prioritized implementation of the injury risk mitigating actions.

A second aspect of the invention provides a centralized server comprising a computer processor coupled to a computer-readable memory unit, the memory unit comprising instructions that when executed by the computer processor implements a workplace risk factor identification method comprising: monitoring, by the computer processor via execution of multiple geographically distributed sensor devices, a plurality of workplace injury based events associated with a plurality of individuals at a multisite distributed workplace environment; storing, by the computer processor within the centralized server, current injury data describing the plurality of workplace injury based events; generating, by the computer processor based on the current injury data and previously retrieved injury data describing previously retrieved historical workplace injury based events, predicted future workplace injury based events associated with future workplace injury based events with respect to a predicted plurality of individuals at the multisite distributed workplace environment; generating, by the computer processor based on the predicted future workplace injury based events, injury risk mitigating actions associated with prevention of the predicted future workplace injury based events; and generating, by the computer processor based the injury risk mitigating actions, a cost optimized reduction plan for prioritized implementation of the injury risk mitigating actions.

A third aspect of the invention provides a computer program product, comprising a computer readable hardware storage device storing a computer readable program code, the computer readable program code comprising an algorithm that when executed by a computer processor of a centralized server implements a workplace risk factor identification method, the method comprising: monitoring, by the computer processor via execution of multiple geographically distributed sensor devices, a plurality of workplace injury based events associated with a plurality of individuals at a multisite distributed workplace environment; storing, by the computer processor within the centralized server, current injury data describing the plurality of workplace injury based events; generating, by the computer processor based on the current injury data and previously retrieved injury data describing previously retrieved historical workplace injury based events, predicted future workplace injury based events associated with future workplace injury based events with respect to a predicted plurality of individuals at the multisite distributed workplace environment; generating, by the computer processor based on the predicted future workplace injury based events, injury risk mitigating actions associated with prevention of the predicted future workplace injury based events; and generating, by the computer processor based the injury risk mitigating actions, a cost optimized reduction plan for prioritized implementation of the injury risk mitigating actions.

The present invention advantageously provides a simple method and associated system capable of determining workplace safety issues.

DETAILED DESCRIPTION

Figure 1:
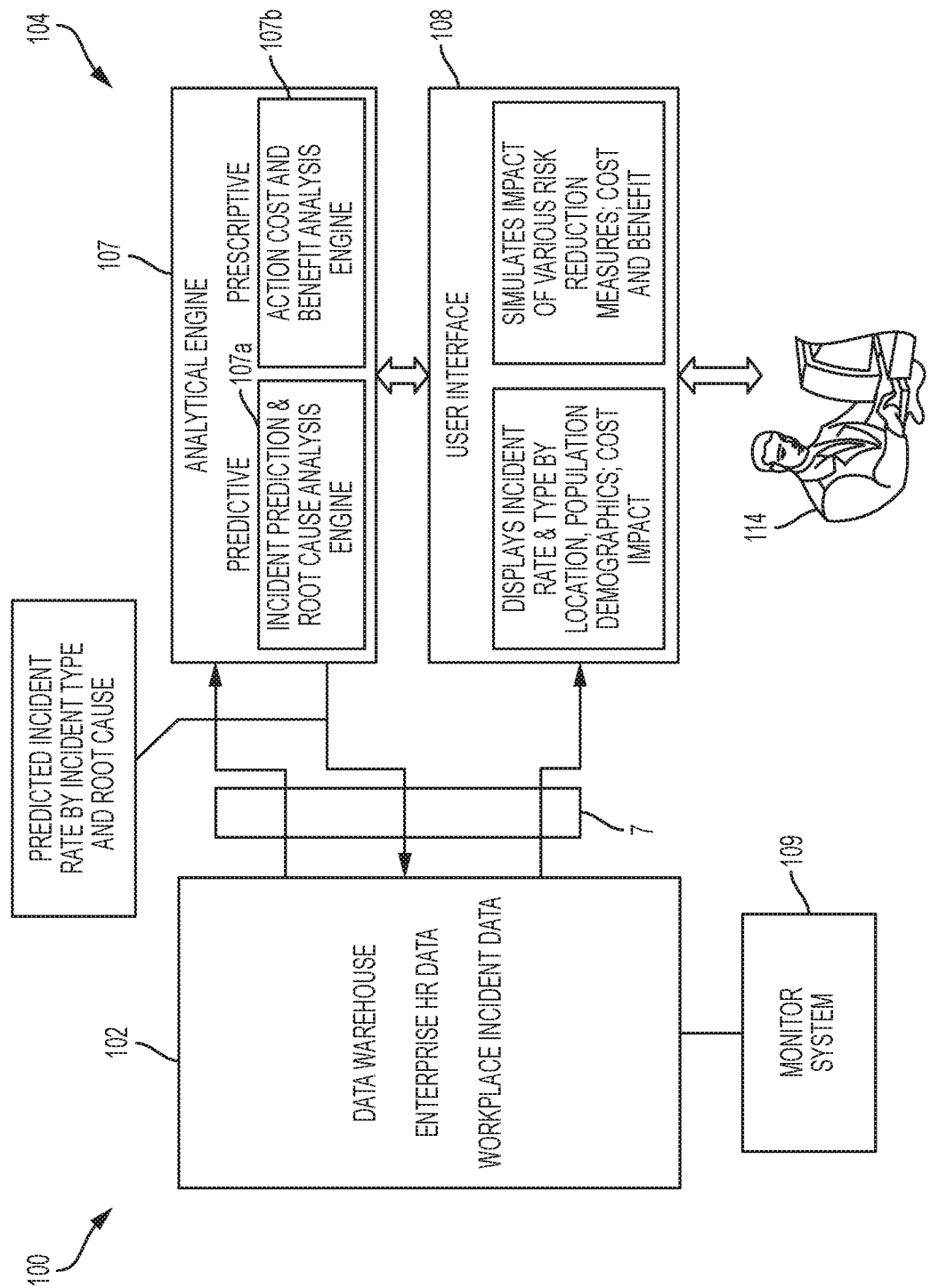
FIG. 1 illustrates a workplace risk factor identification system for enabling a process for automatically performing a multi-scale spatiotemporal analytics process for monitoring, visualization, prediction, and prescriptive management of workplace safety risks, in accordance with embodiments of the present invention.

FIG. 1 illustrates a workplace risk factor identification system 100 for enabling a process for automatically performing a multi-scale spatiotemporal analytics process for monitoring, visualization, prediction, and prescriptive management of workplace safety risks, in accordance with embodiments of the present invention. System 100 comprises components enabling a process that includes active monitoring and recording of: workplace injury events, a type of injury, a demographic profile of individuals involved with the injury, and associated productivity loss/costs. System 100 additionally predicts future injury events/risks including, inter alia, a timing of an injury, an injury type, a work location, propensity scores, and associated demographics using a multi-scale spatiotemporal analytical model that combines multiple time series and clustering models each generated in a different scale in space and time. System 100 uses the predicted risks to prescribe an investment budget for mitigating predicted injury risks via usage of a cost of injury model. System 100 additionally enables an end user 114 to manage workplace risks via an interactive spatiotemporal visualization engine feeding directly into an associated mobile device.

System 100 of FIG. 1 includes data warehouse system 102 connected through a network 7 to an analytical computing system 104 and a user interface system 108. Additionally, data warehouse system 102 may comprise (internally) or be connected to a monitor system 109 comprising multiple differing sensors. Each of data warehouse system 102, analytical computing system 104, monitor system 109, and user interface system 108 may comprise or be comprised by an embedded controller. An embedded controller is defined herein as a computer comprising a dedicated functionality that enables various system tasks that an operating system does not handle. An embedded controller may include specific internal dedicated hardware such as a microcontroller (a CPU comprising integrated memory and peripherals), internal integrated sensors, (i.e., dedicated monitoring hardware), and internal integrated GPS hardware. Additionally, an embedded controller may include its own RAM and flash ROM for its own internal software. Each of data warehouse system 102, analytical computing system 104, monitor system, and user interface system 108 may include a CPU, dedicated monitoring hardware, and a memory system. The memory system 8 may include a single memory system. Alternatively, the memory system may include a plurality of memory systems. Network 7 may include any type of network including, inter alia, a local area network, (LAN), a wide area network (WAN), the Internet, a wireless network, etc.

Monitor system 109 comprises sensors for monitoring workplace injury events. The workplace injury events may be monitored via a plurality of sensing devices including, inter alia, RFID sensors for identification, video camera based sensors for automatically recording the workplace injury events (for performing a root cause analysis), and mobile device type sensors for near real time reporting of the injury events. All monitored or reported workplace injury events are stored in a data warehouse 102 (e.g., a centralized server) for further analysis with respect to tagging events that resulted in loss time. Workplace injury events may include, inter alia, body stressing related injuries, traffic accident related injuries, hitting objects with a part of the body related injuries, illness/medical condition related injuries, biological factor related injuries, mental stress related injuries, fall related injuries, ergonomic related injuries, chemical related injuries, heat related injuries, etc. The workplace injury events may be associated or correlated with employee demographics, a location of a workplace, activities at a workplace, etc. Data ware house 102 stores all data related to time and type of incident, demographics of the employee, loss time, SME review report of the incident, etc.

Analytical computing system 104 comprises an analytical engine 107 comprising a predictive engine module 107a and a prescriptive engine module 107b. Predictive engine module 107a enables a process for predicting future workplace injury events by analyzing historic injury event data stored in data warehouse 102. The historic injury event data is ingested by a centralized processing unit (of analytical computing system 104) and predictive engine module 107a is executed to create a prediction with respect to an occurrence of future workplace injury events. The predicted future workplace injury events are sorted based on: a time of occurrence, a location and frequency of an occurrence, demographics of the employee with respect to being prone to workplace injury events, and a severity of workplace injury events. Prescriptive engine module 107b is enabled to prescribe injury risk mitigation actions. The predicted and sorted future workplace injury events (i.e., generated and sorted by predictive engine module 107a) comprise an input to prescriptive engine module 107b. Prescriptive engine module 107b generates as an output: incident risk resolution options, a cost of resolution option, and an expected gain in terms of cost savings from a reduced incident rate. In response, a workplace supervisor may navigate (via user interface system 108 and/or a mobile device) existing risk resolution steps requiring attention. Additionally, workplace supervisor may prioritize existing risk resolution steps comprising a highest impact. Additionally, system 100 comprises an optimization system for generating a cost optimized risk resolution plan based on a predicted incidents frequency and a severity and the cost of a resolution.

User interface system 108 comprises a graphical user interface (GUI) that displays all resulting output from predictive engine module 107a and prescriptive engine module 107b.

Figure 2:
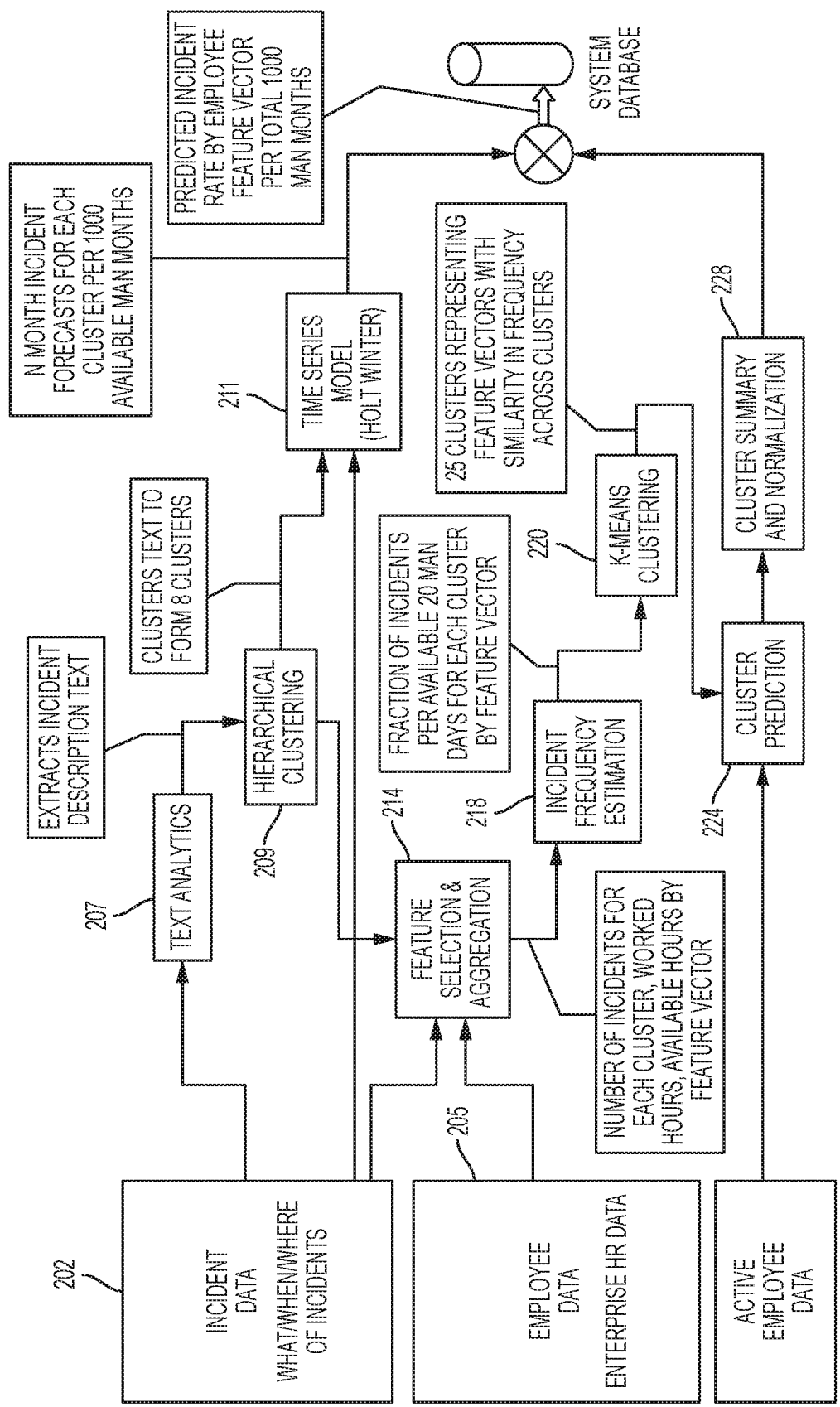
FIG. 2 illustrates a block diagram detailing a process flow enabled by the predictive engine module of FIG. 1 for predicting future workplace injury events, in accordance with embodiments of the present invention.

FIG. 2 illustrates a block diagram detailing a process flow enabled by predictive engine module 107a of FIG. 1 for predicting future workplace injury events, in accordance with embodiments of the present invention. The process flow detailed with respect to FIG. 2 retrieves historical injury event data 202 recorded in a centralized system. In response, a centralized processing unit ingests historic injury event data 202 to generate a prediction with respect to an occurrence of future injury events by: a time of occurrence, a location and frequency of occurrence, and demographics with respect to an employee likely to be prone to the future injury events. The following block sequence of steps illustrates the process for predicting future workplace injury events:

Block 202 represents historical injury event data 202 recorded in a centralized system. Historical injury event data 202 comprises enterprise HR data and incident records data.

Block 207 enables a process for using historical incident data to identify various incident types and predict an occurrence rate for the a next specified month period by enabling a text analytics process with respect to incident text for extraction of keywords describing an incident.

Block 209 performs a hierarchical clustering process with respect to incident keywords (via usage of Ward's method) to obtain a set of distinct incident types defined by incident description text. Block 211 executes a set of time series models for each incident cluster type to predict a rate of future occurrence for each incident type.

Block 214 uses historic enterprise HR data to evaluate worked man hours for each employee by month and year. Time series models are enabled to predict productive man hours per a next specified month period. Additionally, the historic enterprise HR data and incident data are used to extract a demographic pattern of occurrence for various incident types. A random forest model is used (in block 218) to extract important demographic features followed by an aggregation and isolation process with respect to a frequency of occurrence of each incident type for a selected feature vector.

Block 220 executes a clustering algorithm to cluster demographic attributes by occurrence of frequencies across all identified incident types. Block 224 extracts demographic profiles of an active population and predicts a cluster id for an associated demographic profile. Block 228 normalizes a cluster level prediction by evaluating a proportional contribution of a demographic feature vector with respect to each incident type. Additionally, all models are combined to predict an incident type, a rate, and a detailed analytical model with respect to employee demographic features.

Figure 3:
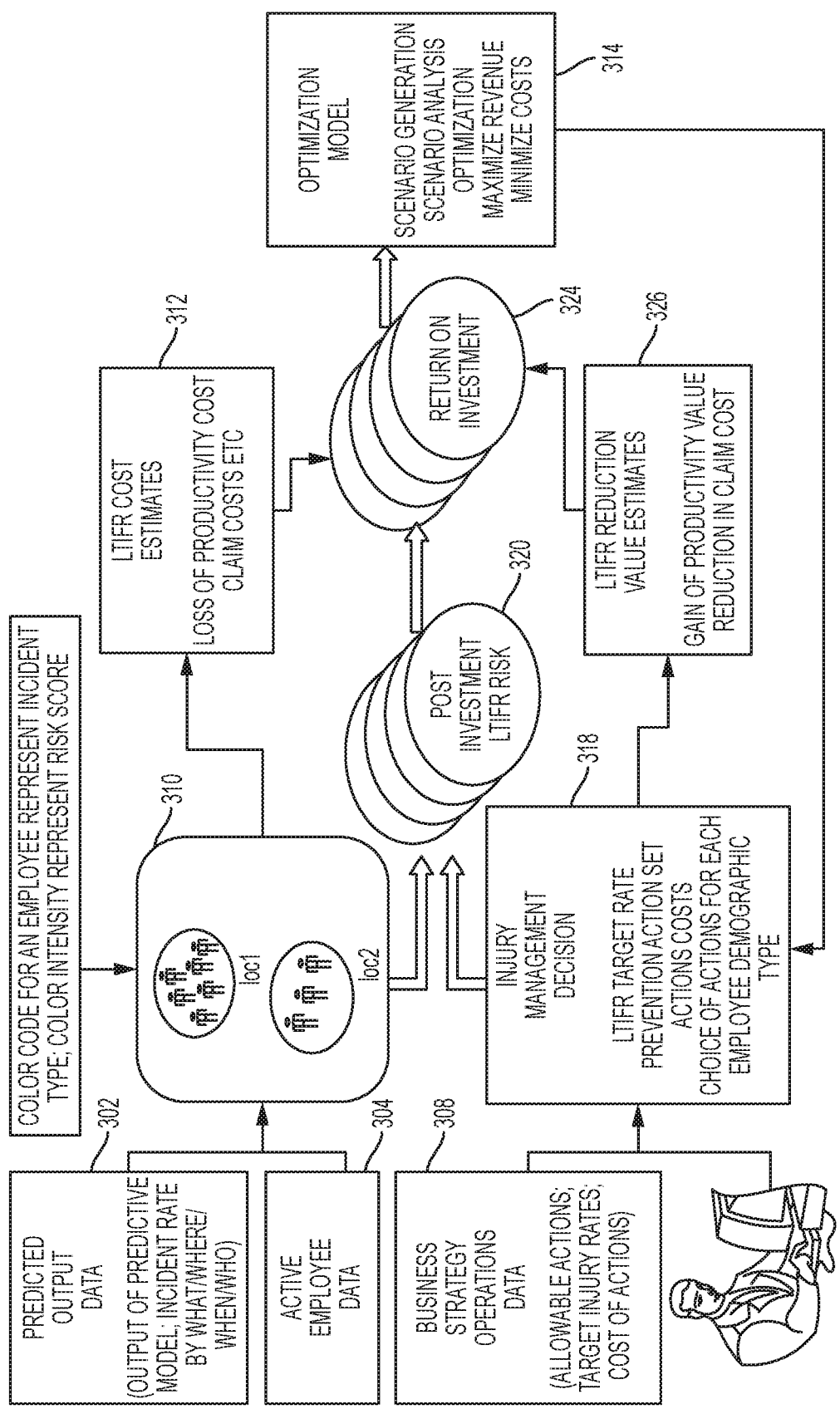
FIG. 3 illustrates a block diagram detailing a process flow enabled by the prescriptive engine module of FIG. 1 for prescribing injury risk mitigation actions related to workplace injury events, in accordance with embodiments of the present invention.

FIG. 3 illustrates a block diagram detailing a process flow enabled by prescriptive engine module 107b of FIG. 1 for prescribing injury risk mitigation actions related to workplace injury events, in accordance with embodiments of the present invention. The following block sequence of steps illustrates the process for prescribing injury risk mitigation actions related to workplace injury events:

Block 310 retrieves predicted output data 302 (from predictive engine module 107a of FIG. 1) and active employee related data 304 and illustrates employees at two differing locations with respect to an indication related to what type of workplace injury events are more likely to occur at the two differing locations.

Block 312 computes a productivity loss and additional injury claims costs expected to be incurred by an organization due to predicted future workplace injury events for each type.

Block 308 represents a business strategy and operations data input outlining: a set of actions for reducing injury risks, a cost to an organization for each action, and business targets for productivity and injury rates.

Block 314 represents an optimization model for computing an optimal action for mitigating an injury risk by generating recommended actions for correcting root causes for workplace injury events resulting in a maximal gain in productivity at a minimal cost of action. In response, a workplace supervisor may act on the recommended actions a user interface.

Block 318 represents an injury management decision unit for managing executed actions with respect to business constraints and budget issues.

Block 320 represents an engine for computing an adjusted risk with respect to an executed action for eliminating a cause of an injury.

Block 324 computes a realized return on investment for a selected action the realized return is computed with respect to reduced injury rates due to executing a risk mitigation action. Additionally, the optimization model (of block 314) continues to re-evaluate a next best action using realized returns data, past executed actions, predicted injury risks by region, business targets, and a leftover allocated budget.

Figure 4A:
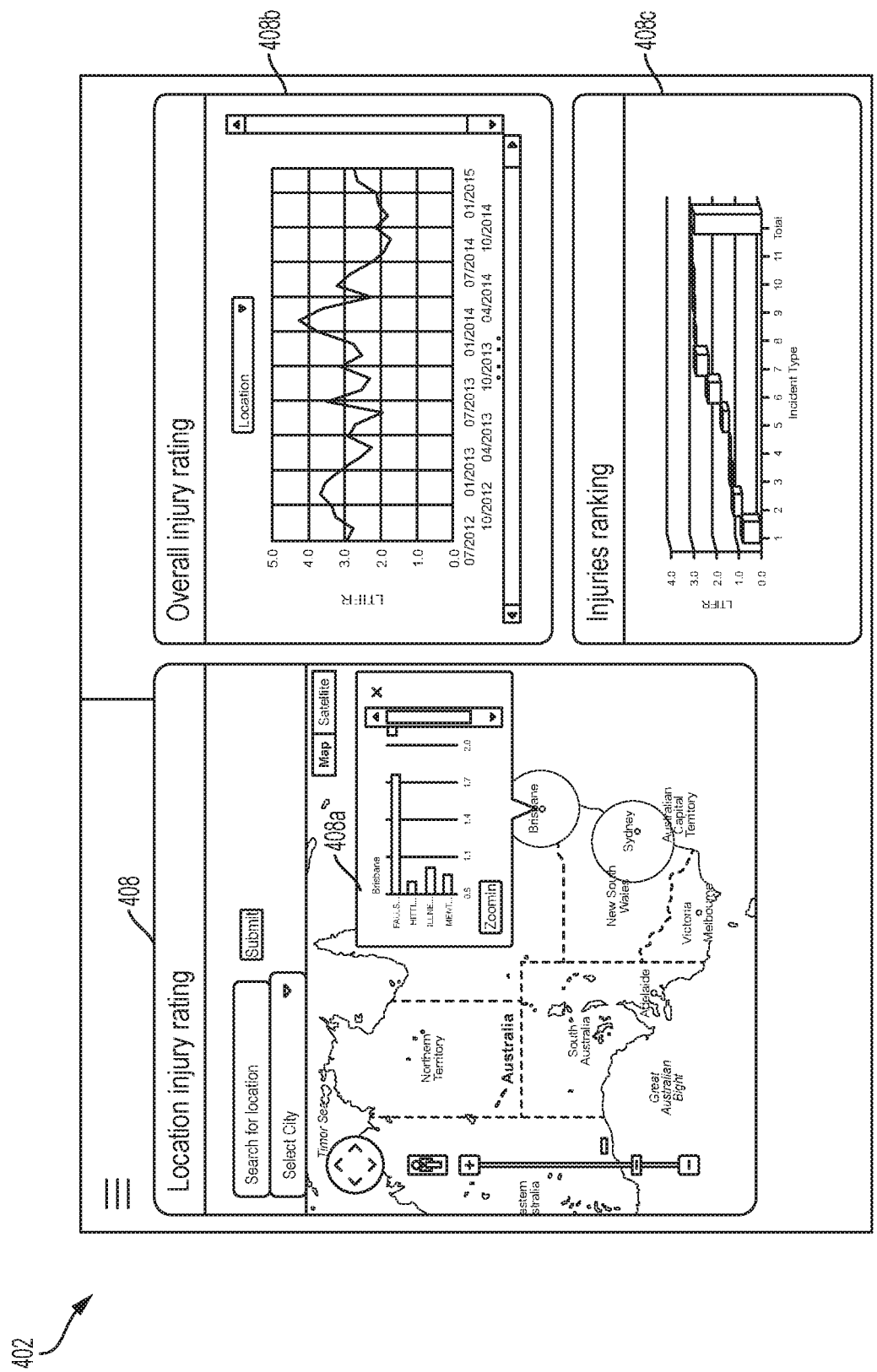
FIG. 4A illustrates a first GUI interface output enabled by the predictive engine module of FIG. 1 for predicting future workplace injury events, in accordance with embodiments of the present invention.

FIG. 4A illustrates a GUI interface 402 enabled by predictive engine module 107a of FIG. 1 for predicting future workplace injury events, in accordance with embodiments of the present invention. GUI interface 402 is enabled to present (to a supervisor via a handheld device) location wise injury ratings 408. Additionally, GUI interface 402 is enabled to present a clickable view portion 408a that presents an injury frequency by injury type at a selected location. GUI interface 402 is further enabled to present a portion 408b illustrating how injury ratings have changed over time and predicted ratings at any selected location. Furthermore, GUI interface 402 is enabled to present a portion 408c illustrating injury types that make up an overall injury rating and associated prominent injury types.

Figure 4B:
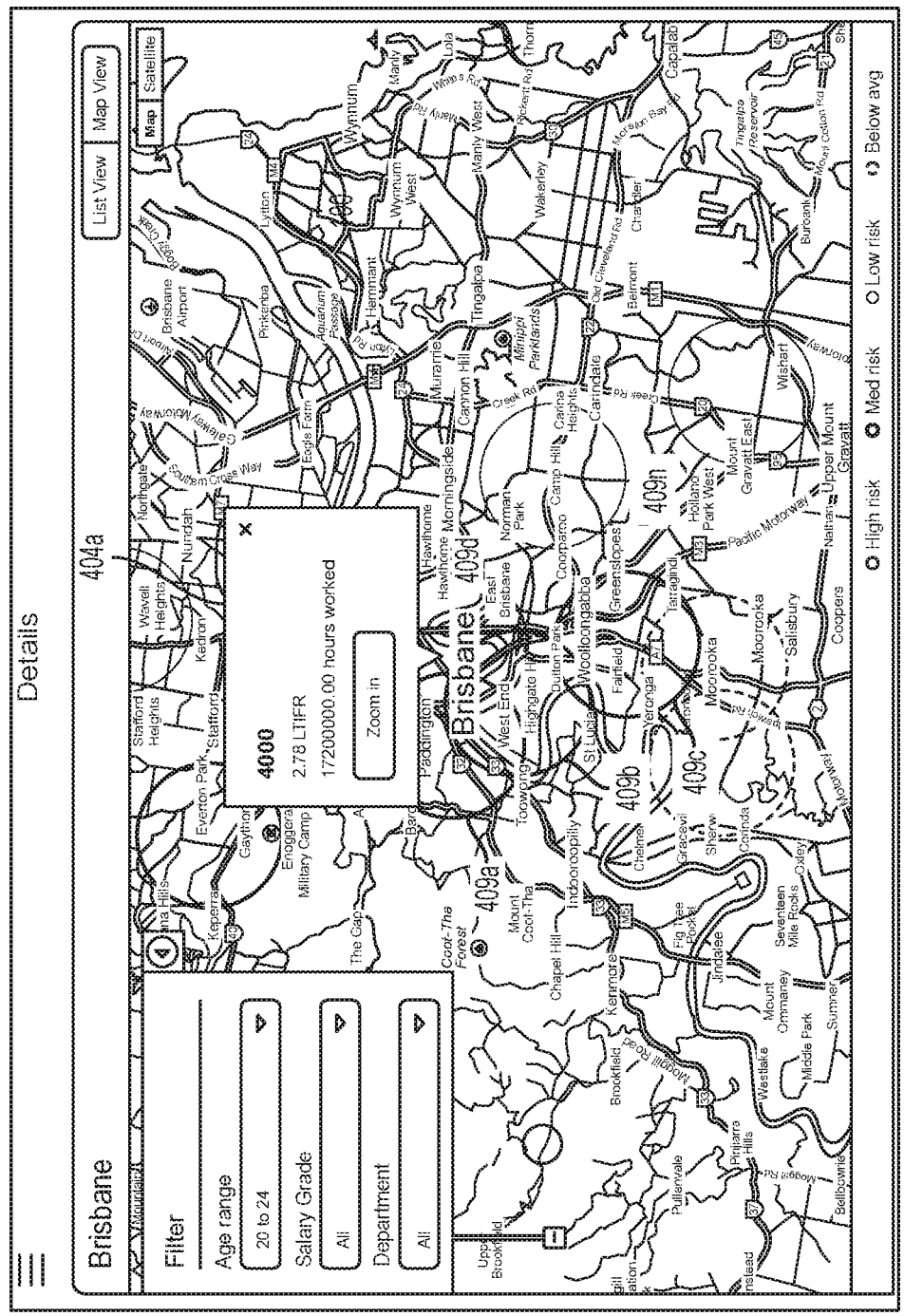
FIG. 4B illustrates a second GUI interface output enabled by the predictive engine module of FIG. 1 for predicting future workplace injury events, in accordance with embodiments of the present invention.

FIG. 4B illustrates a GUI interface 404 enabled by predictive engine module 107a of FIG. 1 for predicting future workplace injury events, in accordance with embodiments of the present invention. GUI interface 404 is enabled to present (to a supervisor via a handheld device) an entire organization's predicted injury heat map including various portions categorized by employee demographic attributes such as, inter alia, age, salary grade, work department, etc. Clickable view portion 404a (i.e., enabled by clicking a location on the map) presents a location zip code along with predicted injury ratings and the man hours worked at the location. Differing sizes of geometrical portions 409a . . . 409n indicate a size of an associated population impacted by the injuries. Additionally, various colors or shading may indicate differing severity levels.

Figure 5A:
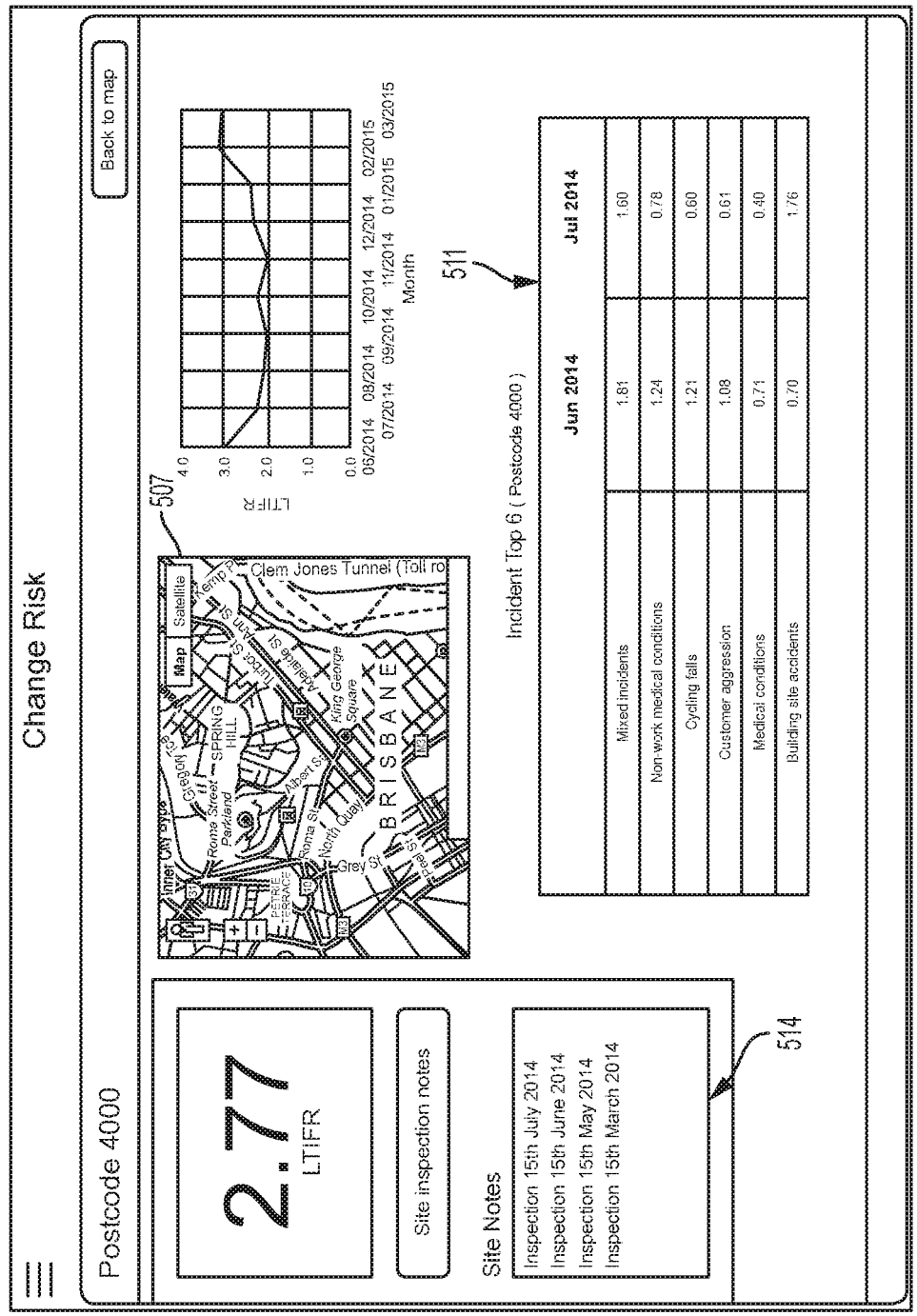
FIG. 5A illustrates a first GUI interface output enabled by the prescriptive engine module of FIG. 1 for prescribing injury risk mitigation actions related to workplace injury events, in accordance with embodiments of the present invention.

FIG. 5A illustrates a GUI interface 508 enabled by prescriptive engine module 107b of FIG. 1 for prescribing injury risk mitigation actions related to workplace injury events, in accordance with embodiments of the present invention. GUI interface 508 is enabled via selection of a zip code in GUI interface 404 (of FIG. 4B). GUI interface 508 zooms into an area 507 mapped by the zip code. A viewer is presented with top incidents 511 by month and their respective ratings. Previous inspection notes 514 may be displayed and a list of recommended actions to choose from to fix a root cause of injuries is presented via GUI interface 508.

Figure 5B:
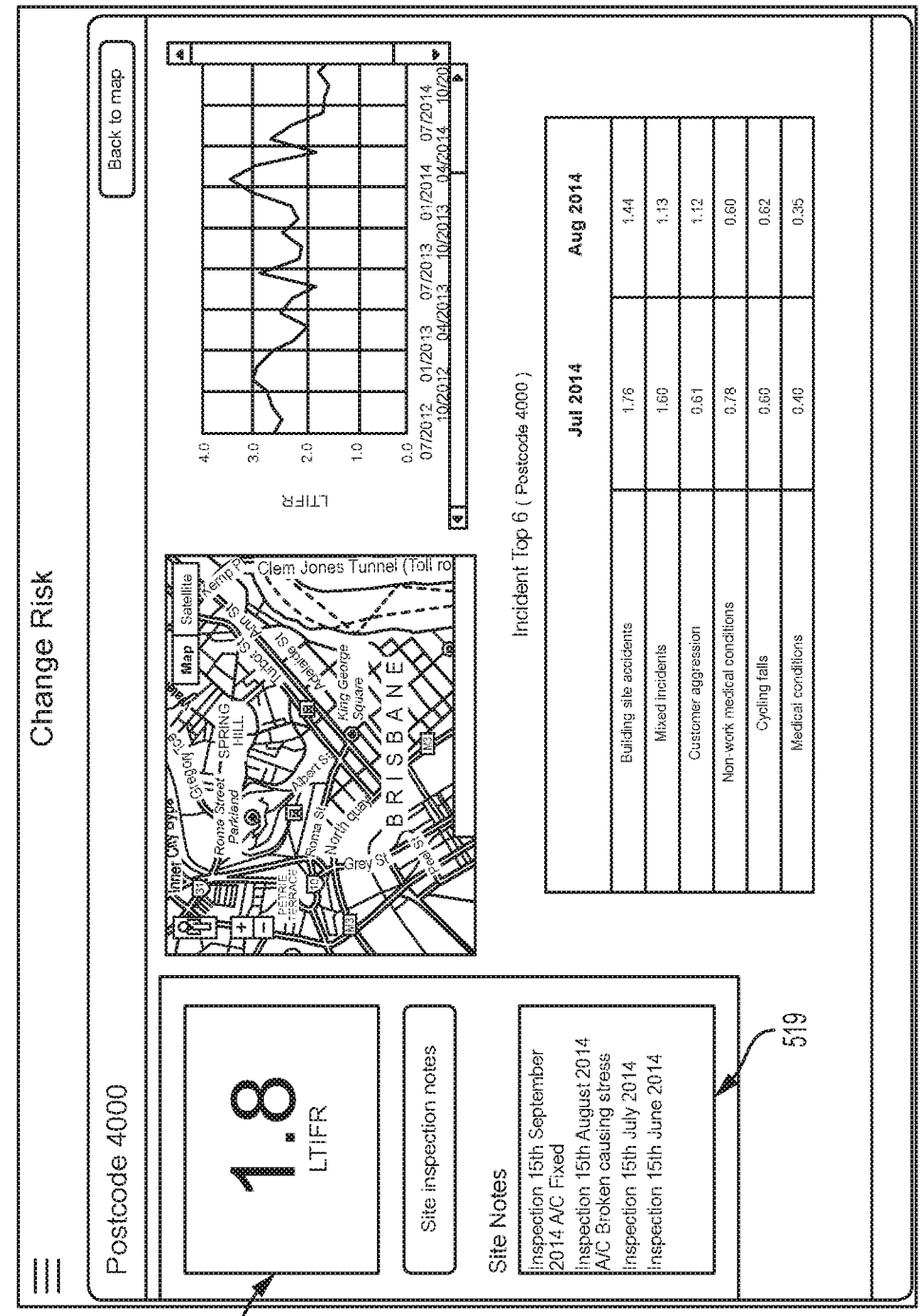
FIG. 5B illustrates a second GUI interface output enabled by the prescriptive engine module of FIG. 1 for prescribing injury risk mitigation actions related to workplace injury events, in accordance with embodiments of the present invention.

FIG. 5B illustrates a GUI interface 510 enabled by prescriptive engine module 107b of FIG. 1 for prescribing injury risk mitigation actions related to workplace injury events, in accordance with embodiments of the present invention. GUI interface 510 illustrates an impact with respect to an injury rating post correcting an injury root cause. Inspection notes 519 may be updated. An LTIFR value 521 may be presented in another color to illustrate a post AC repair action causing stress related injuries at the location.

Figure 6:
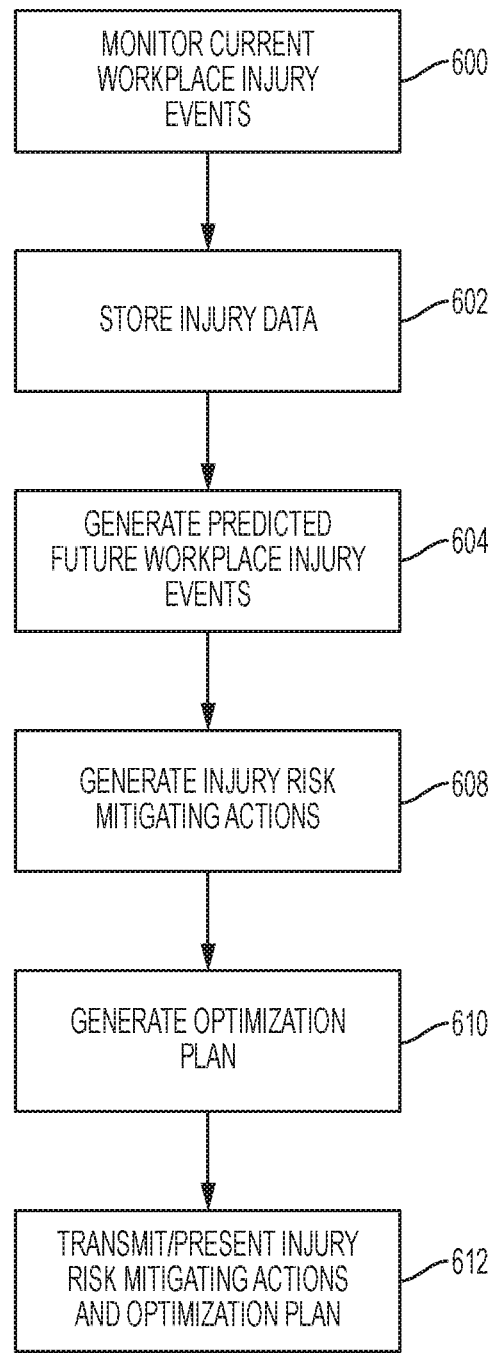
FIG. 6 illustrates an algorithm detailing a process flow enabled by the system of FIG. 1 for automatically performing a multi-scale spatiotemporal analytics process for monitoring, visualization, prediction, and prescriptive management of workplace safety risks, in accordance with embodiments of the present invention.

FIG. 6 illustrates an algorithm detailing a process flow enabled by system 100 of FIG. 1 for automatically performing a multi-scale spatiotemporal analytics process for monitoring, visualization, prediction, and prescriptive management of workplace safety risks, in accordance with embodiments of the present invention. Each of the steps in the algorithm of FIG. 6 may be enabled and executed in any order by a computer processor executing computer code. In step 600, a plurality of workplace injury based events (associated with a plurality of individuals at a multisite distributed workplace environment) are monitored by a centralized server via execution of multiple geographically distributed sensor devices. The plurality of workplace injury based events may include, inter alia, body stress events, motor vehicle accident related events, bodily injury related events, medical condition related events, biological factor related events, mental stress related events, chemical accident related events, heat related events, etc. In step 602, current injury data describing the plurality of workplace injury based events is stored. In step 604, predicted future workplace injury based events (associated with future workplace injury based events with respect to a predicted plurality of individuals at the multisite distributed workplace environment) are generating based on the current injury data and previously retrieved injury data describing previously retrieved historical workplace injury based events. The predicted future workplace injury based events may be generated with respect to future times of occurrence, future locations and frequencies of occurrence, and demographics with respect to the predicted plurality of individuals at the multisite distributed workplace environment. Generating the predicted future workplace injury based events may include:
1. Identifying event types associated with the predicted future workplace injury based events.
2. Predicting hours worked by the individuals with respect to a month and a year.
3. Extracting (from the current injury data and previously retrieved injury data) a demographics pattern with respect to occurrences of the event types.

Identifying the event type may include:
1. Executing a text analytics process and a hierarchal clustering process with respect to the current injury data to identify distinct injury type signatures.
2. Evaluating a probabilistic map with respect to an injury signature of the injury type signatures that is associated with the demographics pattern via a series of classification processes.
3. Computing a severity or loss time impact of each injury signature of the distinct injury type signatures.
4. Identifying a root cause with respect to each injury signature via a text analytics process applied to an injury log.
5. Reviewing information associated with the root cause.
6. Executing a set of time series models to predict an incident rate with respect to the injury type signatures.

Extracting the demographics pattern may include:
1. Executing a random forest model with respect to extracting important demographic features of the individuals.
2. Isolating a frequency of occurrence with respect to each event type based on a selected feature vector.
3. Executing a clustering algorithm to cluster the predicted future workplace injury based events based on a frequency of occurrence across the event types.

In step 608, injury risk mitigating actions associated with prevention of the predicted future workplace injury based events are generated based on the predicted future workplace injury based events. In step 610, a cost optimized reduction plan for prioritized implementation of the injury risk mitigating actions is generated based the injury risk mitigating actions. A process for generating the injury risk mitigation actions may include executing a integer linear program to extract a prioritized list of risk mitigation actions from a list comprising the distinct injury type signatures. Executing the integer linear program may be based on: a predicted frequency, severity, and expected loss per event of each injury signature; an estimated cost of injury risk mitigation steps for each injury signature; and a process for maximizing a return on investment for each injury signature. In step 612, the injury risk mitigating actions and the cost optimized reduction plan are transmitted to a mobile device executing an interactive spatio-temporal application for presentation to a user.

Figure 7:
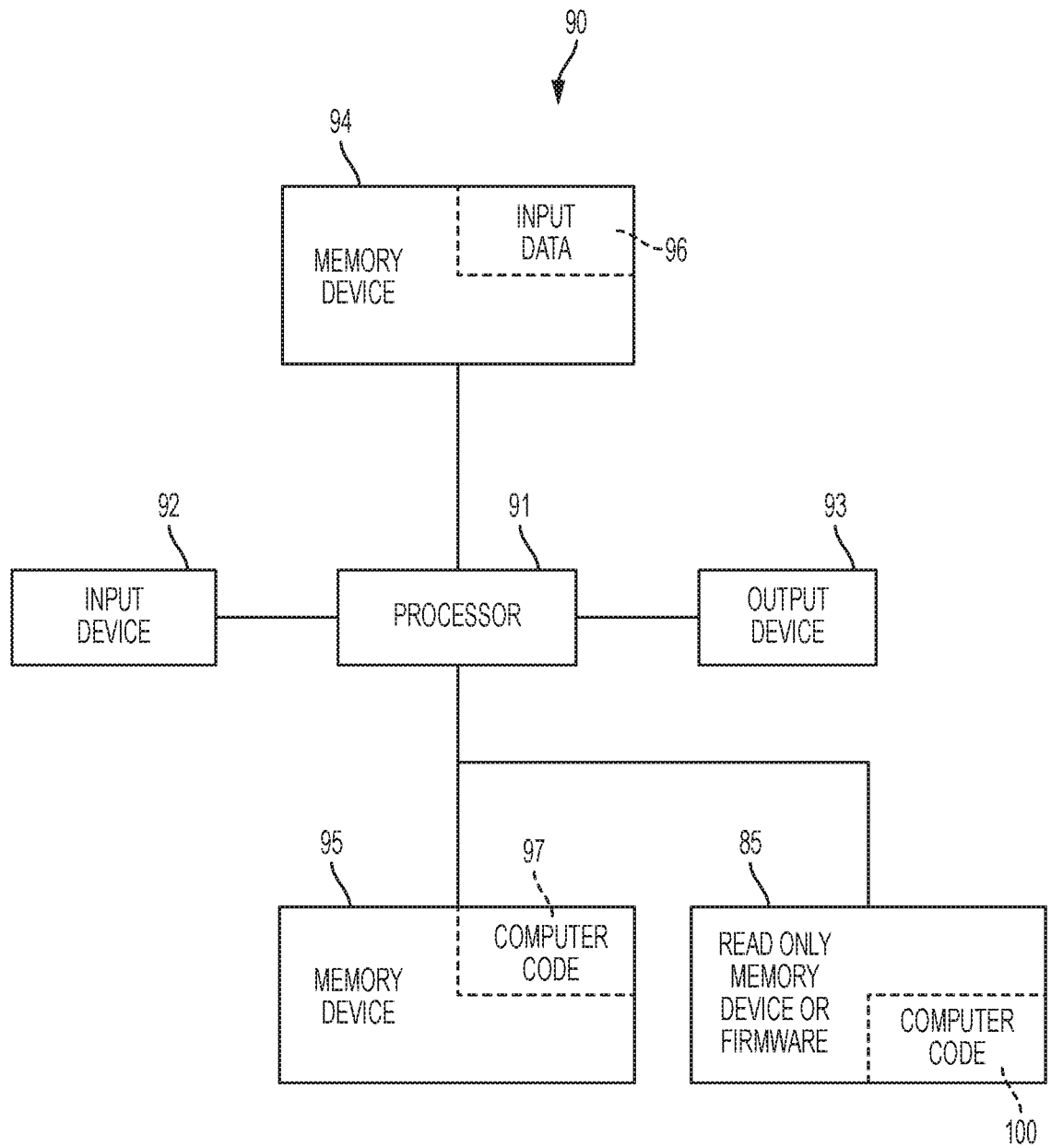
FIG. 7 illustrates a computer system used by or comprised by the system of FIG. 1 for enabling a process for automatically performing a multi-scale spatiotemporal analytics process for monitoring, visualization, prediction, and prescriptive management of workplace safety risks, in accordance with embodiments of the present invention.

FIG. 7 illustrates a computer system 90 (e.g., data warehouse system 102, analytical computing system 104, monitor system 109, or user interface system 108 of FIG. 1) used by or comprised by system 100 of FIG. 1 for enabling a process for automatically performing a multi-scale spatiotemporal analytics process for monitoring, visualization, prediction, and prescriptive management of workplace safety risks, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2 and 3) for enabling a process for automatically performing a multi-scale spatiotemporal analytics process for monitoring, visualization, prediction, and prescriptive management of workplace safety risks. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include the algorithms of FIGS. 2 and 3 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture)

of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including the algorithms of FIGS. 2-3) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 84 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to enable a process for automatically performing a multi-scale spatiotemporal analytics process for monitoring, visualization, prediction, and prescriptive management of workplace safety risks. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for automatically performing a multi-scale spatiotemporal analytics process for monitoring, visualization, prediction, and prescriptive management of workplace safety risks. In another embodiment, the invention provides a business method that performs the process steps of the invention on a subscription, advertising, and/or fee basis. That is, a service supplier, such as a Solution Integrator, could offer to enable a process for automatically performing a multi-scale spatiotemporal analytics process for monitoring, visualization, prediction, and prescriptive management of workplace safety risks. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A workplace risk factor identification and safety issue incident resolution method comprising:
   monitoring, by a computer processor of an embedded controller comprising internal dedicated electronic circuitry comprising a programmable logic array utilizing state information of specialized firmware program code configured to execute specialized software for personalizing the electronic circuitry for executing multiple geographically distributed dedicated hardware sensor devices, a plurality of workplace injury based events associated with a plurality of individuals at a multisite distributed workplace environment, wherein said dedicated hardware sensor devices comprise RFID sensors for identification, video camera based sensors for automatically recording said plurality of workplace injury based events, and mobile device type sensors for near real time reporting of said plurality of workplace injury based events;
   tagging, by said computer processor, said plurality of workplace injury based events;
   correlating, by said processor, said plurality of workplace injury based events with a location of said multisite distributed workplace environment and activities detected at said multisite distributed workplace environment;
   storing, by said computer processor within a centralized server, results of said correlating and current injury data describing said plurality of workplace injury based events comprising tags from said tagging;
   presenting, by said computer processor via a first clickable interactive view portion of a first GUI interface in response to activating said first clickable interactive view portion and a second clickable interactive view portion of a second GUI interface in response to activating said second clickable interactive view portion, a frequency of injury type at selected locations and injury locations associated with specified zip codes;
   presenting, by said computer processor via a third clickable interactive view portion of a third GUI interface in response to activating said clickable interactive view portion, repair actions associated with said plurality of workplace injury based events;
   performing, by said computer processor, a hierarchical clustering process with respect to incident keywords to obtain a set of distinct incident types defined by incident description text;
   executing, by said computer processor, a set of time series models for each incident cluster type to predict a rate of future occurrence for each incident type of said set of distinct incident types;
   executing, by said computer processor, a clustering algorithm to cluster demographic attributes by occurrence of frequencies across all identified incident types;
   extracting, by said computer processor, demographic profiles of an active population of said plurality of individuals;
   predicting, by said computer processor, a cluster id for an associated demographic profile of said demographic profiles;
   normalizing, by said computer processor, each cluster level prediction by evaluating a proportional contribution of a demographic feature vector with respect to each said incident type;
   combining, by said computer processor, said set of time series models to predict an incident type, a rate, and a detailed analytical model with respect to employee demographic features;
   generating, by said computer processor based on said current injury data, said frequency of injury type at selected locations, said injury locations, said repair actions, and previously retrieved injury data describing previously retrieved historical workplace injury based events, predicted future workplace injury based events associated with future workplace injury based events with respect to a predicted plurality of individuals at said multisite distributed workplace environment;

sorting, by said processor, said predicted future workplace injury based events with respect to employee associated workplace events generating, by said computer processor based on said predicted future workplace injury based events and results of said correlating and said sorting, injury risk mitigating actions associated with prevention of said predicted future workplace injury based events;

identifying, by said computer processor via a text analytics process applied to an injury log, root causes for said plurality of workplace injury events with respect to injury signatures of previous work related injuries to identify distinct injury type signatures caused by activities monitored via said RFID sensors, said video camera based sensors, and said mobile device type sensors;

evaluating, by said computer processor, a probabilistic map with respect to an injury signature of said distinct injury type signatures associated with a demographic pattern via a series of classification process;

identifying, by said computer processor, a root cause, of said root causes, with respect to each said injury signature via a text analytics process applied to said injury log;

executing said injury risk mitigating actions such that said root causes are corrected thereby mitigating injury risks associated with workplace safety resulting in a maximal gain in productivity, incident risk resolution options, and reduced injury rates with respect to a frequency, severity, and expected loss associated with body stress events, motor vehicle accident related events, bodily injury related events, medical condition related events, biological factor related events, mental stress related events, chemical accident related events, and heat related events; and deploying, maintaining, and integrating computer-readable code into said embedded controller for execution of said method associated with improving said incident risk resolution options and reducing workplace injury rates.

2. The method of claim 1, further comprising:
transmitting, by said computer processor to a mobile device executing an interactive spatio-temporal application, said injury risk mitigating actions and a cost optimized reduction plan for presentation to a user.

3. The method of claim 1, wherein said predicted future workplace injury based events are generated with respect to future times of occurrence, future locations and frequencies of occurrence, and demographics with respect to said predicted plurality of individuals at said multisite distributed workplace environment.

4. The method of claim 1, wherein said generating said predicted future workplace injury based events comprises:
identifying event types associated with said predicted future workplace injury based events;
predicting hours worked by said individuals with respect to a month and a year; and
extracting, from said current injury data and previously retrieved injury data, a demographics pattern with respect to occurrences of said event types.

5. The method of claim 4, wherein said identifying said event types comprises:
executing a text analytics process and a hierarchal clustering process with respect to said current injury data to identify distinct injury type signatures;

evaluating a probabilistic map with respect to an injury signature of said injury type signatures that is associated with said demographics pattern via a series of classification processes;
computing a severity or loss time impact of each injury signature of said distinct injury type signatures;
identifying a root cause with respect to each said injury signature via a text analytics process applied to an injury log;
reviewing information associated with said root cause; and
executing a set of time series models to predict an incident rate with respect to said injury type signatures.

6. The method of claim 4, wherein said extracting said demographics pattern comprises:
executing a random forest model with respect to extracting important demographic features of said individuals;
isolating a frequency of occurrence with respect to each event type based on a selected feature vector; and
executing a clustering algorithm to cluster said predicted future workplace injury based events based on said frequency of occurrence across said event types.

7. The method of claim 6, wherein said generating said injury risk mitigation actions comprises:
executing a integer linear program to extract a prioritized list of risk mitigation actions from a list comprising said distinct injury type signatures, wherein said executing said integer linear program is based on: a predicted frequency, severity, and expected loss per event of each said injury signature; an estimated cost of injury risk mitigation steps for each said injury signature; and a process for maximizing a return on investment for each said injury signature.

8. The method of claim 1, further comprising:
providing at least one support service for at least one of creating, integrating, hosting, maintaining, and deploying computer-readable code in the computing system, said code being executed by the computer processor to implement: said monitoring, said storing, said generating said predicted future workplace injury based events, and said generating said injury risk mitigating actions.

9. An embedded controller comprising internal dedicated electronic circuitry comprising a programmable logic array utilizing state information of specialized firmware program code configured to execute specialized software for personalizing the electronic circuitry and a computer processor coupled to a computer-readable memory unit, said memory unit comprising instructions that when executed by the computer processor and the internal dedicated electronic circuitry implements a workplace risk factor identification and safety issue incident resolution method comprising:
monitoring, by said computer processor via execution of multiple geographically distributed dedicated hardware sensor devices, a plurality of workplace injury based events associated with a plurality of individuals at a multisite distributed workplace environment, wherein said dedicated hardware sensor devices comprise RFID sensors for identification, video camera based sensors for automatically recording said plurality of workplace injury based events, and mobile device type sensors for near real time reporting of said plurality of workplace injury based events;
tagging, by said computer processor, said plurality of workplace injury based events;
correlating, by said processor, said plurality of workplace injury based events with a location of said multisite distributed workplace environment and activities detected at said multisite distributed workplace environment;

storing, by said computer processor within a centralized server, results of said correlating and current injury data describing said plurality of workplace injury based events comprising tags from said tagging;

presenting, by said computer processor via a first clickable interactive view portion of a first GUI interface in response to activating said first clickable interactive view portion and a second clickable interactive view portion of a second GUI interface in response to activating said second clickable interactive view portion, a frequency of injury type at selected locations and injury locations associated with specified zip codes;

presenting, by said computer processor via a third clickable interactive view portion of a third GUI interface in response to activating said clickable interactive view portion, repair actions associated with said plurality of workplace injury based events;

performing, by said computer processor, a hierarchical clustering process with respect to incident keywords to obtain a set of distinct incident types defined by incident description text;

executing, by said computer processor, a set of time series models for each incident cluster type to predict a rate of future occurrence for each incident type of said set of distinct incident types;

executing, by said computer processor, a clustering algorithm to cluster demographic attributes by occurrence of frequencies across all identified incident types;

extracting, by said computer processor, demographic profiles of an active population of said plurality of individuals;

predicting, by said computer processor, a cluster id for an associated demographic profile of said demographic profiles;

normalizing, by said computer processor, each cluster level prediction by evaluating a proportional contribution of a demographic feature vector with respect to each said incident type;

combining, by said computer processor, said set of time series models to predict an incident type, a rate, and a detailed analytical model with respect to employee demographic features;

generating, by said computer processor based on said current injury data, said frequency of injury type at selected locations, said injury locations, said repair actions, and previously retrieved injury data describing previously retrieved historical workplace injury based events, predicted future workplace injury based events associated with future workplace injury based events with respect to a predicted plurality of individuals at said multisite distributed workplace environment;

sorting, by said processor, said predicted future workplace injury based events with respect to employee associated workplace events generating, by said computer processor based on said predicted future workplace injury based events and results of said correlating and said sorting, injury risk mitigating actions associated with prevention of said predicted future workplace injury based events;

identifying, by said computer processor via a text analytics process applied to an injury log, root causes for said plurality of workplace injury events with respect to injury signatures of previous work related injuries to identify distinct injury type signatures caused by activities monitored via said RFID sensors, said video camera based sensors, and said mobile device type sensors;

evaluating, by said computer processor, a probabilistic map with respect to an injury signature of said distinct injury type signatures associated with a demographic pattern via a series of classification process;

identifying, by said computer processor, a root cause, of said root causes, with respect to each said injury signature via a text analytics process applied to said injury log;

executing said injury risk mitigating actions such that said root causes are corrected thereby mitigating injury risks associated with workplace safety resulting in a maximal gain in productivity, incident risk resolution options, and reduced injury rates with respect to a frequency, severity, and expected loss associated with body stress events, motor vehicle accident related events, bodily injury related events, medical condition related events, biological factor related events, mental stress related events, chemical accident related events, and heat related events; and deploying, maintaining, and integrating computer-readable code into said embedded controller for execution of said method associated with improving said incident risk resolution options and reducing workplace injury rates.

10. The embedded controller of claim 9, wherein said method further comprises:

transmitting, by said computer processor to a mobile device executing an interactive spatio-temporal application, said injury risk mitigating actions and a cost optimized reduction plan for presentation to a user.

11. The embedded controller of claim 9, wherein said predicted future workplace injury based events are generated with respect to future times of occurrence, future locations and frequencies of occurrence, and demographics with respect to said predicted plurality of individuals at said multisite distributed workplace environment.

12. The embedded controller of claim 9, wherein said generating said predicted future workplace injury based events comprises:

identifying event types associated with said predicted future workplace injury based events;

predicting hours worked by said individuals with respect to a month and a year; and extracting, from said current injury data and previously retrieved injury data, a demographics pattern with respect to occurrences of said event types.

13. The embedded controller of claim 12, wherein said identifying said event types comprises:

executing a text analytics process and a hierarchal clustering process with respect to said current injury data to identify distinct injury type signatures;

evaluating a probabilistic map with respect to an injury signature of said injury type signatures that is associated with said demographics pattern via a series of classification processes;

computing a severity or loss time impact of each injury signature of said distinct injury type signatures;

identifying a root cause with respect to each said injury signature via a text analytics process applied to an injury log;

reviewing information associated with said root cause; and executing a set of time series models to predict an incident rate with respect to said injury type signatures.

14. The embedded controller of claim 12, wherein said extracting said demographics pattern comprises:
- executing a random forest model with respect to extracting important demographic features of said individuals;
- isolating a frequency of occurrence with respect to each event type based on a selected feature vector; and
- executing a clustering algorithm to cluster said predicted future workplace injury based events based on said frequency of occurrence across said event types.

15. The embedded controller of claim 14, wherein said generating said injury risk mitigation actions comprises:
- executing a integer linear program to extract a prioritized list of risk mitigation actions from a list comprising said distinct injury type signatures, wherein said executing said integer linear program is based on: a predicted frequency, severity, and expected loss per event of each said injury signature; an estimated cost of injury risk mitigation steps for each said injury signature; and a process for maximizing a return on investment for each said injury signature.

16. A computer program product, comprising a computer readable hardware storage device storing a computer readable program code, said computer readable program code comprising an algorithm that when executed by a computer processor of an embedded controller comprising internal dedicated electronic circuitry comprising a programmable logic array utilizing state information of specialized firmware program code configured to execute specialized software for personalizing the electronic circuitry for implementing a workplace risk factor identification and safety issue incident resolution method, said method comprising:
- monitoring, by said computer processor via execution of multiple geographically distributed dedicated hardware sensor devices, a plurality of workplace injury based events associated with a plurality of individuals at a multisite distributed workplace environment, wherein said dedicated hardware sensor devices comprise RFID sensors for identification, video camera based sensors for automatically recording said plurality of workplace injury based events, and mobile device type sensors for near real time reporting of said plurality of workplace injury based events;
- tagging, by said computer processor, said plurality of workplace injury based events;
- correlating, by said processor, said plurality of workplace injury based events with a location of said multisite distributed workplace environment and activities detected at said multisite distributed workplace environment storing, by said computer processor within a centralized server, results of said correlating and current injury data describing said plurality of workplace injury based events comprising tags from said tagging;
- presenting, by said computer processor via a first clickable interactive view portion of a first GUI interface in response to activating said first clickable interactive view portion and a second clickable interactive view portion of a second GUI interface in response to activating said second clickable interactive view portion, a frequency of injury type at selected locations and injury locations associated with specified zip codes;
- presenting, by said computer processor via a third clickable interactive view portion of a third GUI interface in response to activating said clickable interactive view portion, repair actions associated with said plurality of workplace injury based events;
- performing, by said computer processor, a hierarchical clustering process with respect to incident keywords to obtain a set of distinct incident types defined by incident description text;
- executing, by said computer processor, a set of time series models for each incident cluster type to predict a rate of future occurrence for each incident type of said set of distinct incident types;
- executing, by said computer processor, a clustering algorithm to cluster demographic attributes by occurrence of frequencies across all identified incident types;
- extracting, by said computer processor, demographic profiles of an active population of said plurality of individuals;
- predicting, by said computer processor, a cluster id for an associated demographic profile of said demographic profiles;
- normalizing, by said computer processor, each cluster level prediction by evaluating a proportional contribution of a demographic feature vector with respect to each said incident type;
- combining, by said computer processor, said set of time series models to predict an incident type, a rate, and a detailed analytical model with respect to employee demographic features;
- generating, by said computer processor based on said current injury data, said frequency of injury type at selected locations, said injury locations, said repair actions, and previously retrieved injury data describing previously retrieved historical workplace injury based events, predicted future workplace injury based events associated with future workplace injury based events with respect to a predicted plurality of individuals at said multisite distributed workplace environment;
- sorting, by said processor, said predicted future workplace injury based events with respect to employee associated workplace events
- generating, by said computer processor based on said predicted future workplace injury based events and results of said correlating and said sorting, injury risk mitigating actions associated with prevention of said predicted future workplace injury based events;
- identifying, by said computer processor via a text analytics process applied to an injury log, root causes for said plurality of workplace injury events with respect to injury signatures of previous work related injuries to identify distinct injury type signatures caused by activities monitored via said RFID sensors, said video camera based sensors, and said mobile device type sensors;
- evaluating, by said computer processor, a probabilistic map with respect to an injury signature of said distinct injury type signatures associated with a demographic pattern via a series of classification process;
- identifying, by said computer processor, a root cause, of said root causes, with respect to each said injury signature via a text analytics process applied to said injury log;
- executing said injury risk mitigating actions such that said root causes are corrected thereby mitigating injury risks associated with workplace safety resulting in a maximal gain in productivity, incident risk resolution options, and reduced injury rates with respect to a frequency, severity, and expected loss associated with body stress events, motor vehicle accident related events, bodily injury related events, medical condition related events, biological factor related events, mental stress related events, chemical accident related events, and heat related events; and deploying, maintaining, and integrating computer-readable code into said embedded controller for execution of said method associated with improving said incident risk resolution options and reducing workplace injury rates.

17. The computer program product of claim 16, wherein said method further comprises:

transmitting, by said computer processor to a mobile device executing an interactive spatio-temporal application, said injury risk mitigating actions and a cost optimized reduction plan for presentation to a user.

18. The computer program product of claim 16, wherein said predicted future workplace injury based events are generated with respect to future times of occurrence, future locations and frequencies of occurrence, and demographics with respect to said predicted plurality of individuals at said multisite distributed workplace environment.

19. The computer program product of claim 16, wherein said generating said predicted future workplace injury based events comprises:

identifying event types associated with said predicted future workplace injury based events;

predicting hours worked by said individuals with respect to a month and a year; and extracting, from said current injury data and previously retrieved injury data, a demographics pattern with respect to occurrences of said event types.

20. The computer program product of claim 19, wherein said identifying said event types comprises:

executing a text analytics process and a hierarchal clustering process with respect to said current injury data to identify distinct injury type signatures;

evaluating a probabilistic map with respect to an injury signature of said injury type signatures that is associated with said demographics pattern via a series of classification processes;

computing a severity or loss time impact of each injury signature of said distinct injury type signatures;

identifying a root cause with respect to each said injury signature via a text analytics process applied to an injury log;

reviewing information associated with said root cause; and executing a set of time series models to predict an incident rate with respect to said injury type signatures.

* * * * *